United States Patent [19]

Possati

[11] 4,351,115
[45] Sep. 28, 1982

[54] APPARATUS FOR CHECKING THE LINEAR DIMENSIONS OF SHAFTS

[75] Inventor: Mario Possati, Bologna, Italy

[73] Assignee: Finike Italiana Marposs, S.p.A., S. Marino di Bentivoglio, Italy

[21] Appl. No.: 134,084

[22] Filed: Mar. 26, 1980

[30] Foreign Application Priority Data

Apr. 5, 1979 [IT] Italy .................. 3368 A/79

[51] Int. Cl.³ .............................................. G01B 7/12
[52] U.S. Cl. .............................. 33/178 D; 33/174 L; 33/178 E
[58] Field of Search ............. 33/174 L, 178 D, 178 E, 33/178 R, 174 P, 174 Q, 180 B

[56] References Cited

U.S. PATENT DOCUMENTS

| 3,274,693 | 9/1966 | Witzkie | 33/178 D |
| 3,564,721 | 2/1971 | Wilson | 33/174 Q |
| 3,905,116 | 9/1975 | Roberts | 33/174 L |
| 4,122,608 | 10/1978 | Hopf | 33/174 L |
| 4,141,149 | 2/1979 | George et al. | 33/178 D |

FOREIGN PATENT DOCUMENTS

| 523779 | 6/1975 | Japan | 33/178 D |
| 576002 | 3/1946 | United Kingdom | 33/174 R |
| 579771 | 8/1946 | United Kingdom | 33/174 R |
| 579772 | 8/1946 | United Kingdom | 33/143 R |
| 896869 | 5/1962 | United Kingdom | 33/172 E |
| 942134 | 11/1963 | United Kingdom | 33/164 Q |

*Primary Examiner*—Willis Little
*Attorney, Agent, or Firm*—Stevens, Davis, Miller & Mosher

[57] ABSTRACT

An apparatus for checking linear dimensions of shafts comprising, a frame, a centering means connected to the frame to define a horizontal axis for supporting the shaft, a supporting device fixed to the frame, measuring groups adapted to cooperate with the shaft surfaces and connection means which connect the measuring groups to the supporting device. The connection means are adapted to allow the measuring groups to move towards and away from the shafts, along planes perpendicular to the horizontal axis, from up to down and vice versa.

15 Claims, 6 Drawing Figures

APPARATUS FOR CHECKING THE LINEAR DIMENSIONS OF SHAFTS

The present invention relates to an apparatus for checking linear dimensions of shafts, including a frame; centering means connected to the frame to define a horizontal axis for supporting the shaft to be checked; a supporting device fixed to the frame; measuring means having mechanical reference means adapted to contact the shaft, sensing means adapted to cooperate with the shaft surface, transducer and detection means associated with the sensing means to provide signals responsive to the linear dimensions; connection means for connecting the measuring means to the supporting device; and control means.

Apparatuses for checking the linear dimensions of shafts are already known. The Austrian Pat. No. 317,572, for example, discloses an apparatus for checking crankshafts, including a frame supporting a first plate, and a second plate connected to the first by means of flexible wires that allow the second plate to move basically along a plane that is parallel to the plane of the first plate. The second plate supports a plurality of measuring devices, including mechanical reference elements and measuring heads with feelers adapted to cooperate with the crankshaft surface.

The movable connection between the first and the second plate allows the mechanical reference elements to enable movements of the second plate, with respect to the first, so that the measuring axis defined by the reference elements places itself parallel to the shaft axis and the feelers correctly coooperate with the crankshaft surface.

The apparatus also includes supporting devices that position the shaft with respect to the frame. This known apparatus is suitable for measuring in static conditions the dimensions of a crankshaft, but not for performing in dynamic conditions checks on the crankpins.

The technical problem that the present invention intends to solve is that of providing an apparatus that is suitable for checking, in dynamic or static conditions, the linear dimensions of a shaft even if it has a complex shape, that is inexpensive, that can easily be adjusted to check shafts of different shapes and dimensions, that ensures the achievement of extremely reliable measurement accuracy standards that can easily be applied in combination with conveyors transporting shafts that have different dimensions and layout.

This problem is solved by an apparatus of the type outlined at the beginning of the description, wherein, according to the invention, the connection means include at least a pair of arms, a first arm of the pair being rotatable, with respect to the supporting device, along a plane perpendicular to the horizontal axis, and the second arm of the pair being rotatable, with respect to the first arm, along the same plane, the connection means being adapted to allow the measuring means to move towards and away from the horizontal axis, from up to down and vice versa.

The invention is now described in detail with reference to the accompanying drawings, given by way of non-limiting example, wherein the same or equivalent parts are indicated with the same reference numbers, and in which.

Figure 1:
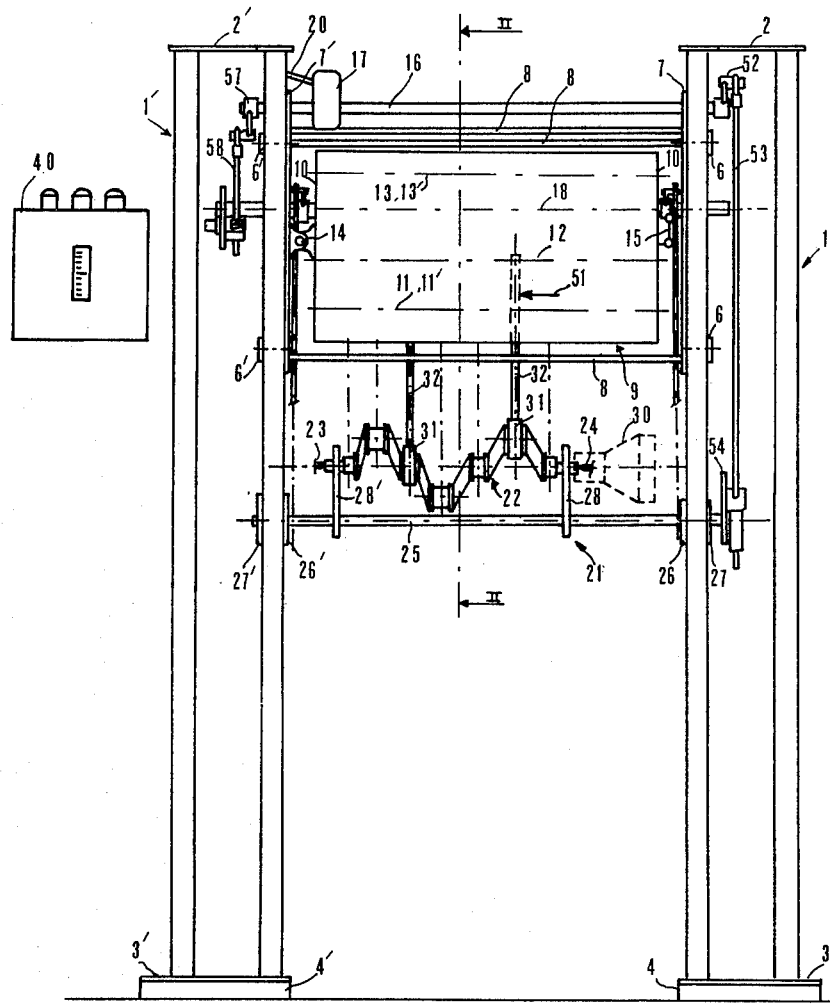
FIG. 1 is a simplified front view of a gauging machine for checking crankshafts, according to a preferred embodiment of the invention.
Figure 2:
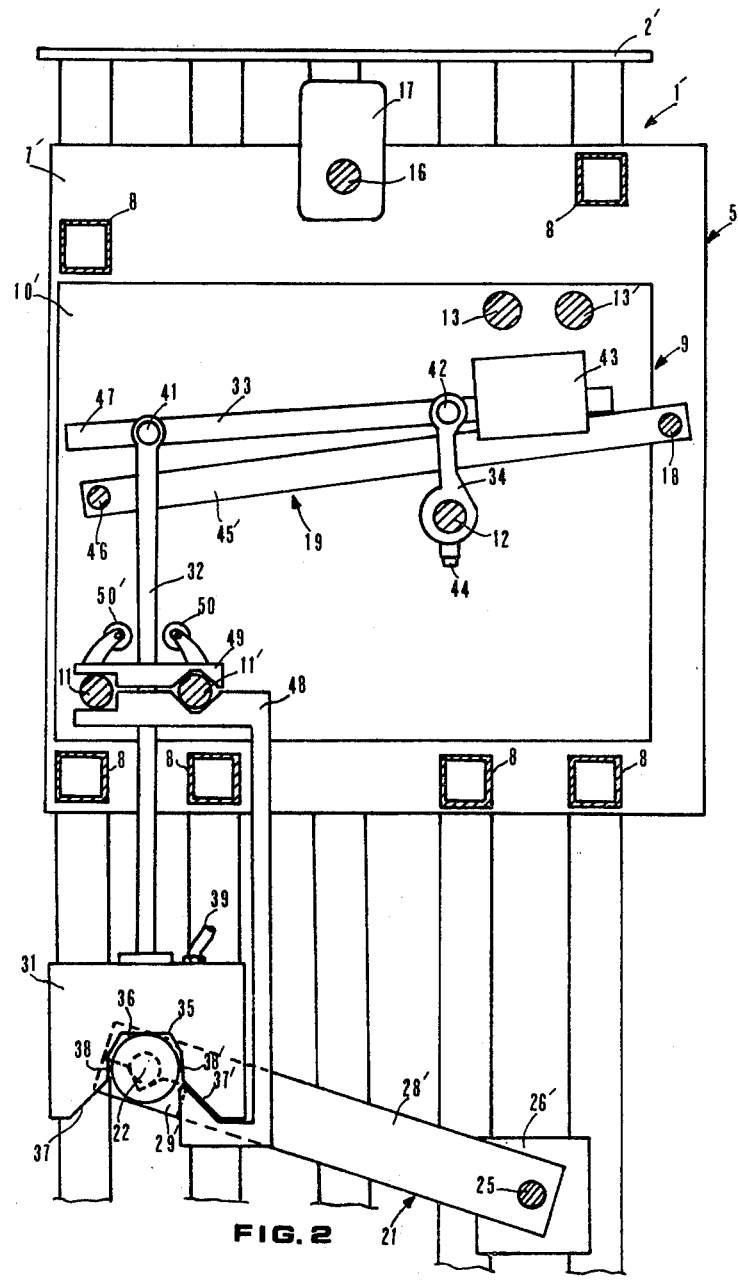
FIG. 2 is a longitudinal, partial, simplified section view of the machine shown in FIG. 1, according to path II—II of FIG. 1.
Figure 3:
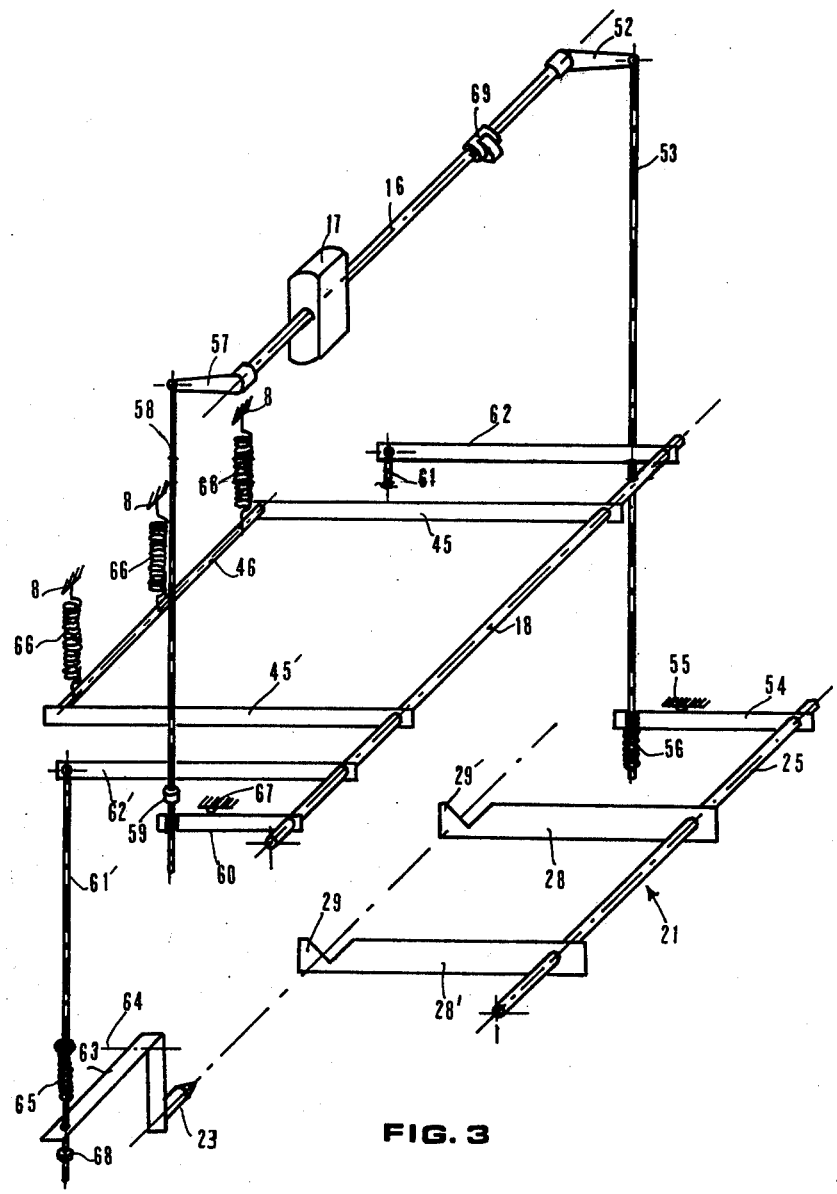
Figure 4:
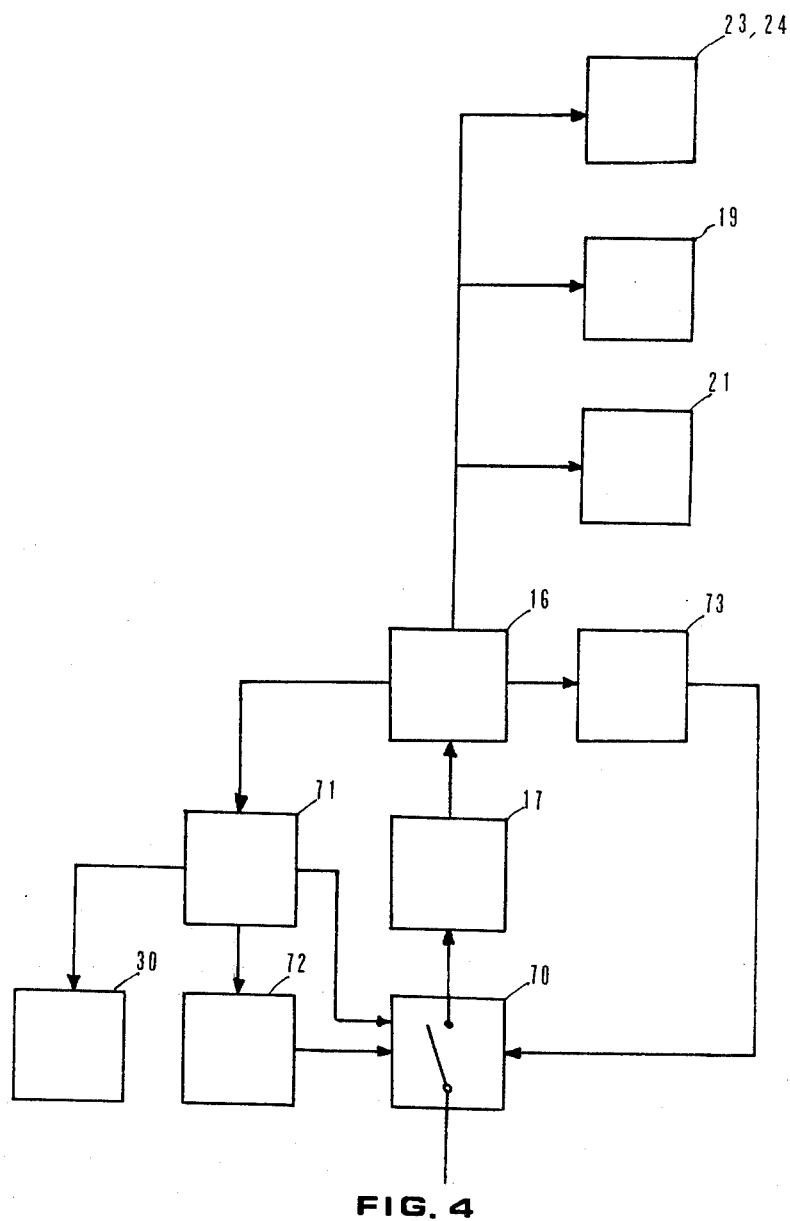

FIG. 3 schematically shows the main kinematic elements of the machine shown in FIGS. 1 and 2;

FIG. 4 is a block diagram showing the basic phases of a measuring cycle; and

Figure 5:
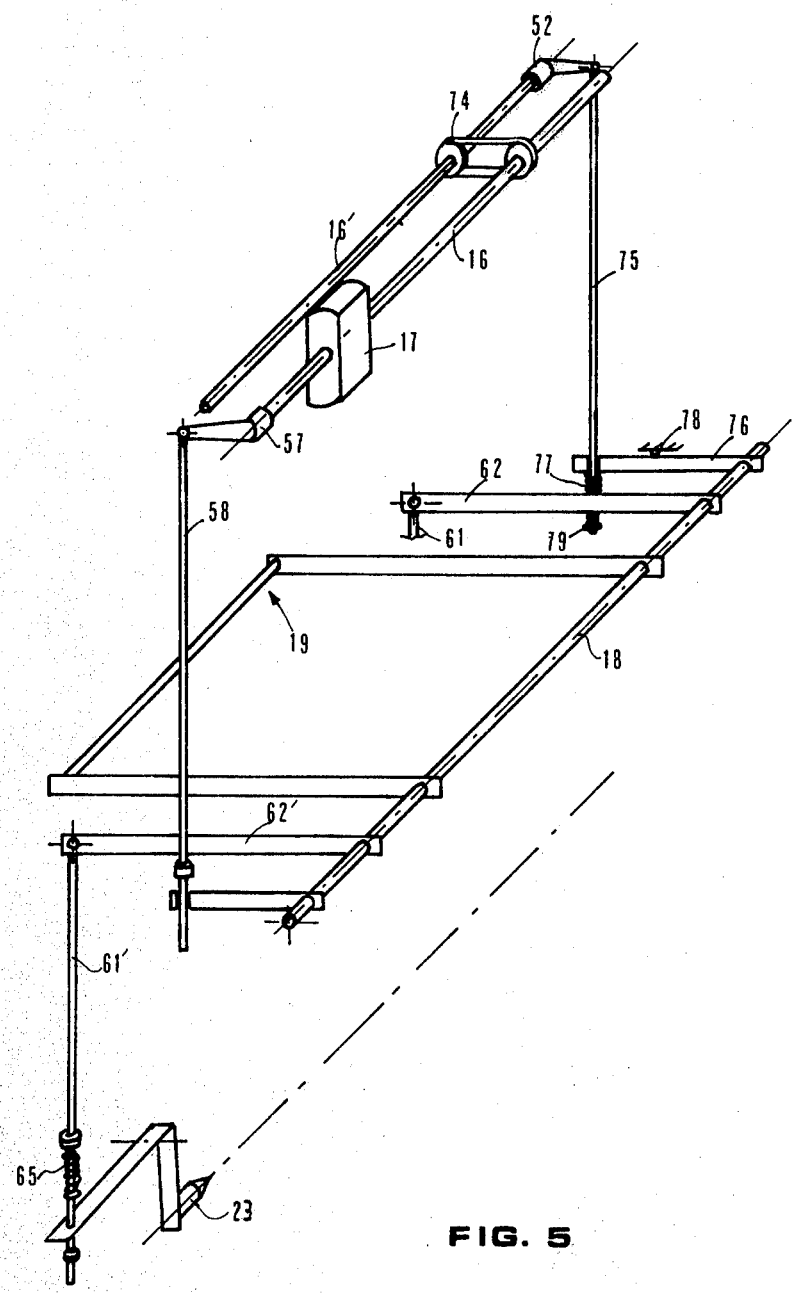
Figure 6:
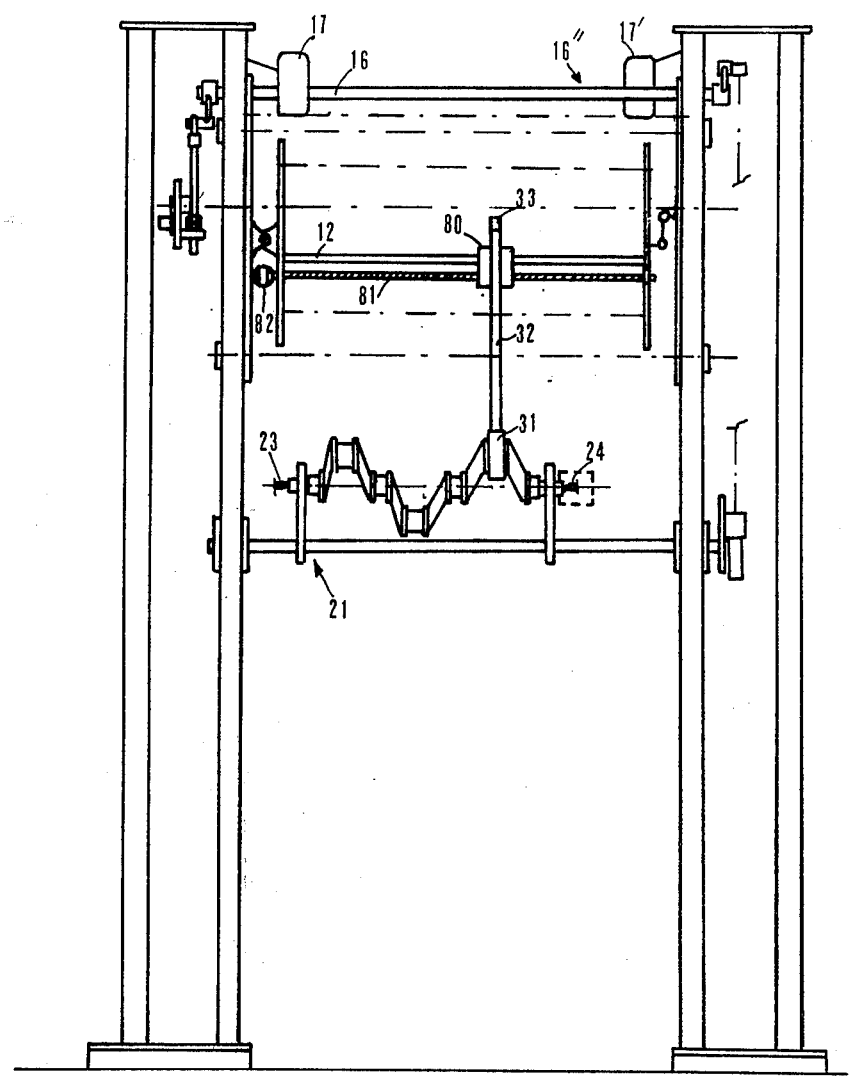

FIGS. 5 and 6 illustrate variants of the embodiment shown in FIGS. 1, 2, 3 and 4.

With reference to FIGS. 1 and 2, the gauging machine includes two stanchions 1, 1' each of which is obtained by soldering five square sectioned tubes with plates that have a triangular shape 2,3 and 2',3'.

Plates 3,3' also serve to fasten stanchions 1,1' to bases 4,4'.

A first external frame 5 is connected to stanchions 1,1' by means of adjustable clamp connections 6,6'. The external frame 5 includes two vertical plates 7,7' with a rectangular profile connected by cross members 8 made of square sectioned tubes.

The adjustable clamps 6,6' allow frame 5 to move vertically to adapt the gauging machine to suit different duty conditions.

A second frame 9, including two rectangular-shaped vertical plates 10,10', supporting shafts 11,11', 12 and 13,13' is isostatically connected to plates 7,7'. The isostatic connection of frame 9 to plates 7,7' prevents possible deformations of stanchions 1,1' as well as possible yieldings of bases 4,4' (if they are of a limited entity), to be transmitted to frame 9, thus straining it. The isostatic connection of frame 9 to plates 7,7' is achieved by a cylindrical hinge 14 and a spheric pendulum 15.

Plates 7,7' also support a horizontal shaft 16, that can be made to rotate by a motor 17 that incorporates a speed reducer, and by another shaft 18 that supports a structure or device 19. Motor 17 is keyed to shaft 16, and its casing is clamped to stanchion 1' by means of a rod 20, to prevent the casing from rotating while shaft 16 remains stationary, when motor 17 is being power supplied.

A loading device 21 picks up successively the crankshafts 22 to be checked from a conveyor (not shown in the figures) passing between the two stanchions 1,1' and raises the crankshaft, thus bringing it near two centers 23 and 24. The loading device 21 (reference is made to FIG. 3 too) includes a shaft 25 connected to stanchions 1,1' by means of vertical support plates 26, 27 and 26', 27'; the latter are fixed to stanchions 1,1' by means of adjustable clamps that allow raising and lowering of the plates and the shaft 25 in order to adapt them to the conveyor height. Loading device 21 also includes two rotating arms 28,28' having V-shaped end parts 29,29'.

Crankshaft 22 to be checked positions itself horizontally within the V-shaped parts 29,29' and is raised by two arms 28, 28', activated by shaft 25. While crankshaft 22 is raised, centers 23 and 24 move towards one another and pick crankshaft 22 up in a determined horizontal position, make it detach from the V-shaped parts 29,29' and support it during the checking phase. The axial distance of the two centers 23 and 24 can be changed to check crankshafts 22 of different lengths.

To one of the two centers, either 23 or 24, it is possible to associate a chuck 30 which clamps on an end of crankshaft 22 and makes it rotate in order to carry out the dynamic check of the crankshaft.

The gauging machine also includes a plurality of measuring units which check the crankshaft 22 dimensions. Each measuring unit includes a mechanical reference device 31 and rods or arms 32 and 33 that, by means of a member 34, connect the mechanical reference device 31 to shaft 12 of frame 9. Each mechanical reference device 31 has a part 35 adapted to cooperate with the surface 36 of the crankshaft 22 to be checked and two guide surfaces 37,37' that ensure the correct radial positioning of the mechanical reference device 31 on surface 36 of crankshaft 22.

Each reference device 31 houses at its interior, in such a way as to provide mechanical protection, a certain number of small measuring or gauging heads with movable feelers, such as those indicated by numbers 38,38', that touch the surface 36 of crankshaft 22, and also houses position transducers which transform the movements of the feelers into electrical signals responsive to the dimensions of the crankshaft 22. A cable 39 contains the power supply wires and connects the outputs of the position transducers to a power supply, detecting, processing and display unit 40.

Each rod 32 is connected to an associated rod 33 by means of pins and ball bearings 41 that are pre-loaded to prevent clearances. Other pins, and associated pre-loaded ball bearings 42, connect rods 33 to members 34. Counterweights 43 are clamped to rods 33 and allow the setting of the force at which the mechanical reference devices 31 cooperate with the surfaces 36 of crankshaft 22. Members 34 can slide horizontally along shaft 12 and be clamped in required positions, thus allowing axial displacements of the mechanical reference devices 31, so that the machine can easily be adapted to check shafts that have a different shape. Setscrews 44 clamp members 34 after having correctly positioned each measuring unit. The connection of the mechanical reference devices 31 to shaft 12 of frame 9, by means of rods 32 and 33 with pins, allows a plane motion of the mechanical reference devices 31, along a plane perpendicular to the axis of the shaft to be checked, in order to follow the trajectories made by the crankpins of the crankshaft 22 while rotating about centers 23 and 24.

The structure 19, shown in FIGS. 2 and 3, acts as a retraction device, allowing the mechanical reference devices 31 to move towards and away from the horizontal axis defined by the two centers 23 and 24, during the loading and unloading phases of crankshaft 22, in order to prevent a defective positioning of the shaft from damaging the gauging heads. The retraction structure 19 includes two arms 45,45' keyed onto shaft 18 and a horizontal crosspiece 46 adapted to cooperate with the end part 47 of rods 33.

Shafts 11,11', shown in FIG. 2, between which pass rods 32, support a fixed axial mechanical reference member 48 that guarantees the correct axial positioning of crankshaft 22 in the measuring position. The axial position of the fixed mechanical reference member 48 can be adjusted by means of an adjustable clamp 49.

On shafts 11,11' there are fixed, in an axially adjustable manner, rollers 50,50' acting as guides for rods 32, to limit oscillations about the associated pins, and to allow them to perform the movements required for following the trajectories of the surfaces of the crankshaft 22 to be checked. The contact of the mechanical reference devices 31 with the surfaces of crankshaft 22 is mainly due to the weight force of the mechanical reference devices 31, which is partially balanced by counterweights 43. The speed at which crankshaft 22 rotates about centers 23 and 24 is limited so that the inertia forces, due to the movement of the masses that constitute the measuring units, are negligible.

Thus, one obtains constant thrusts of the mechanical reference devices 31 on crankshaft 22 regardless of its angular position.

The contact measuring force with which feelers 38,38' touch surfaces 36 is determined by springs belonging to the gauging heads located inside mechanical reference devices 31.

Should it be necessary to carry out checkings by processing together signals detected by gauging heads belonging to different measuring units, for example checkings of concentricity and of axial distances of different main journals, it is possible to mount on shafts 11, 11' gauging heads that detect possible displacements, in an axial direction with respect to crankshaft 22, of rods 32,33 of the relevant measuring units, and consequently displacements of reference devices 31. The signals detected by these gauging heads, one of which, 51, is schematically shown in FIG. 1, are then included in the processings made by unit 40, in order to compensate the displacements of the measuring units.

Shafts 13,13' serve to stiffen frame 9.

The gauging machine is particularly simple and inexpensive also in consideration of the fact that all the movements, exception made for the rotation of the crankshaft, are controlled by a single shaft 16, according to the following description.

With reference to FIG. 3 too, shaft 16, that is rotated counterclockwise by motor 17, causes an end crank 52 to rotate and consequently a rod 53 to raise. The raising of rod 53 causes the clockwise rotation of shaft 25 by means of an arm 54. The rotation of shaft 25 gives rise to the rotation of arms 28, 28' of loading device 21 that moves crankshaft 22 towards the measuring position. The rotation entity of arms 28,28' is set by a limit stop 55 that ensures that the axis of crankshaft 22 places itself slightly below the axis defined by the centers 23 and 24 in their closure position. A spring 56, by loading itself, allows rod 53 to complete its stroke even when arm 54 is stopped by limit stop 55.

A crank 57 is keyed to the second end of shaft 16 so as to lower itself while crank 52 raises. The downward movement of crank 57 makes a rod 58 lower itself. Thus rod 58, by means of a limit stop 59 which can cooperate with an arm 60, causes a counterclockwise rotation of shaft 18. This rotation of shaft 18 makes rod 61,61'—connected to shaft 18 by means of arms 62,62'—lower themselves. The lowering of rods 61,61' causes the rotation of members 63, which support centers 23 and 24, about fulcrums 64 and consequently centers 23 and 24 move towards crankshaft 22. The approach of centers 23 and 24 towards crankshaft 22 continues until the centers touch the center-holes on crankshaft 22. Two springs 65 load thus allowing rods 61,61' to complete their stroke even when centers 23 and 24 are already positioned into the relevant center-holes. The two additional arms 45,45' keyed on shaft 18, determine the lowering of crosspiece 46—of the retraction device 19—that supports the end parts 47 of rods 33 and consequently the lowering of the mechanical reference devices 31 connected to the end parts 47 through rods 32. The lowering of crosspiece 46 enables the mechanical reference devices 31 to move from up to down, towards the axis defined by centers 23 and 24 and to contact the surfaces of crankshaft 22 to be checked only when it is correctly held into position by the two centers 23 and 24.

The beginning of the measuring cycle, which is described also with reference to the block diagram shown in FIG. 4, is controlled by a cam 69 keyed onto shaft 16 (FIG. 3), which activates a microswitch 71. Microswitch 71 controls the switching off of a switch 70 that stops motor 17. Microswitch 71 controls the starting of the motor that makes chuck 30 and consequently, crankshaft 22 rotate, and also activates a timer 72. Timer 72, after a time equivalent to a prefixed number of revolutions of crankshaft 22 has elapsed, controls switching on of switch 70. Timer 72 can be replaced by a counter that counts the number of revolutions of crankshaft 22 and switches on switch 70 when a prefixed number of revolutions has been achieved. While crankshaft 22 is rotating, the movable feelers, such as feelers 38,38', scan the surfaces of the main journals and crankpins providing electric signals that—together with those provided by feelers 51—are processed by unit 40.

During the half revolution, according to which crank 57 accomplishes an upward trajectory, springs 66—having their ends clamped to crosspiece 46 respectively and to one of crosspieces 8 of frame 5—by acting on crosspiece 46 determine the clockwise rotation of shaft 18 and consequently the moving away of the mechanical reference devices 31 from the surfaces of crankshaft 22. A second mechanical limit stop 67, which can cooperate with arm 60, limits the rotation of shaft 18 due to the action of springs 66.

The clockwise rotation of shaft 18 and of arms 62,62' also causes the raising of rods 61,61' that, by means of abutments 68, cause a rotation of members 63 about fulcrums 64 such as to determine the moving away of centers 23, 24 from the crankshaft 22 that has been checked.

Once the supporting action of centers 23 and 24 ceases, loading device 21 moves crankshaft 22 away from the checking position and places it on the underlying conveyor.

These movements are feasible because crank 52 moving in a descending trajectory causes the lowering of rods 53, the latter controlling the loading device 21 movement.

At the end of this half revolution cam 69 activates a second microswitch 73, shown in FIG. 4, which controls the switching off of switch 70 and consequently the stopping of motor 17.

When the machine measuring cycle ends, crankshaft 22—on condition that its dimensions are within the foreseen tolerance limits—continues its travel towards machine tools which perform the successive machining phases, or towards a store; if the piece is out-of-tolerance it is directed to a store for scrap pieces.

The gauging machine can be reactivated by a microswitch, located on the conveyor, that detects the arrival of a following crankshaft to be checked, or manually by a machine operation switching on switch 70.

The gauging machine can be manufactured without loading device 21 and utilize, for its feeding, a loader arranged on the conveyor and the movements of which can synchronize with those of the gauging machine. The variant shown in FIG. 5 refers to this case exactly. According to the variant the retraction device 19 also is controlled in the course of its raising by a crank, instead of by springs 66. The guaging machine shown in FIG. 5 includes a second horizontal shaft 16', that is controlled, together with shaft 16, by motor 17 by means of a chain drive 74.

Rod 58—connected to crank 57 keyed to an end of shaft 16—controls a counterclockwise rotation of shaft 18 and consequently the lowering of the retraction device 19. The rotation of shaft 18 also causes the counterclockwise rotation of arms 62, 62' that, by means of rods 61,61', control the approach movement of centers 23 and 24.

Crank 52, that is keyed at one end of shaft 16' at 180° with respect to crank 57, during the upward half revolution causes a rod 75 connected to it to raise.

The raising of rod 75 controls—by means of an abutment 79 acting on an arm 76—a clockwise revolution of shaft 18, which makes the retraction device 19 raise and the moving apart of centers 23 and 24.

A spring 77 allows rod 75 to complete its stroke, controlled by crank 52, even when arm 76 is stopped by a limit stop 78.

When it is sufficient to accomplish static checkings on crankshafts, it is possible to eliminate centers 23 and 24 and associated control kinematic elements, as well as chuck 30. In this case the correct positioning of the crankshaft to be checked, with respect to the gauging machine, is ensured by V portions 29, 29' of loading device 21, by limit stop 55—shown in FIG. 3—and by the axial mechanical reference member 48—shown in FIG. 2.

If the time required for the checking cycle allows it, it can be convenient to use a single measuring unit that successively scans all the parts to be checked. The solution will be described with reference to the schematic drawing shown in FIG. 6.

In this embodiment the mechanical reference device 31 is connected, by means of rods 32 and 33, to a guide 80 axially sliding along shaft 12. The axial movement of guide 80 is controlled by a worm screw 81 which matches to it.

The rotation of worm screw 81 is controlled by a stepping motor control unit 82 of a type substantially known, which comprises a stepping motor and means, such as counters, to control the steps made by the stepping motor for commanding desired axial positionings of the mechanical reference device 31. This embodiment requires at least two shafts 16,16" in order to control the kinematic elements, one for controlling the retraction device and the other for controlling the movements of centers 23 and 24 and of loading device 21.

Each shaft 16,16" is controlled by independent motors 17,17' because, while the retraction device has to move away and approach the mechanical reference device 31 with respect to the main journals and crankpin of the crankshaft each time that one passes from checking one main journal or crankpin to the following one, the movements of centers 23 and 24 and of loading device 21 have to be controlled just at the beginning and at the end of the measuring cycle.

All these variants to the preferred embodiment of the invention can be realized without carrying out any substantial modifications to the gauging machine structure. This is a direct consequence of the use of driving elements such as connecting rods and cranks that are simple and inexpensive, and also as a consequence of the way in which the measuring units are made.

It is evident that the aforedescribed and illustrated embodiments can undergo other variants and changes equivalent from a functional and structural point of view without departing from the scope of the invention.

What is claimed is:

1. An apparatus for checking linear dimensions of shafts, comprising: a frame; centering means connected to the frame to define a horizontal axis for supporting the shaft to be checked; measuring means having a mechanical reference device adapted to contact the shaft, sensing means mounted on said reference device adapted to cooperate with the shaft surface, transducer and detection means associated with the sensing means to provide signals responsive to the linear dimensions; a supporting device for said measuring means fixed to the frame; connection means for connecting the measuring means to the supporting device; and control means; wherein the connection means include at least a pair of arms and constraint means, a first arm of the pair being rotatable, with respect to the supporting device, along a plane perpendicular to the horizontal axis, and the second arm of the pair being rotatable, with respect to the first arm, along the same plane, the constraint means being adapted to allow the rotations of the arms basically without elastic reactions, the control means including a movable member coupled to the frame for sustaining the connection means with the measuring means, the member being movable for performing a lowering movement and a lifting movement, the lowering movement causing the measuring means to move towards the horizontal axis, substantially from up to down, due to the force of gravity of the measuring means and connecting means, the lifting movement of the member causing a retraction movement of the measuring means away from the horizontal axis, and wherein the mechanical reference device defines reference surfaces adapted to contact the shaft at the end of said lowering movement, the contact forces between the reference surfaces and the shaft being determined substantially by said force of gravity.

2. The apparatus according to claim 1, including counterweight devices fixed to the connection means.

3. The apparatus according to claim 1 or claim 2, wherein the centering means are adapted to allow the rotation of the shaft to be checked about the horizontal axis in order to accomplish the dynamic check of the linear dimensions.

4. The apparatus according to claim 1 or claim 2, wherein the supporting device and the connection means are adapted to allow adjustments of the position of the measuring means in a parallel direction with respect to the horizontal axis.

5. The apparatus according to claim 4, including a position transducer device adapted to provide a signal responsive to the axial position of the measuring means with respect to the horizontal axis, for the positioning of the measuring means with respect to desired parts of the shaft to be checked.

6. The apparatus according to claim 5, wherein the control means include a control device connected to the transducer device to control the positioning of the measuring means.

7. The apparatus according to claim 1 or claim 2, wherein the measuring means include a plurality of mechanical reference devices and the connection means include a plurality of said pairs of arms, each pair being adapted to support a relevant mechanical reference device.

8. The apparatus according to claim 1 or claim 2, wherein the constraint means include rolling bearings.

9. The apparatus according to claim 1 or claim 2, wherein the supporting device includes a main rigid structure and isostatic connection means of the structure to said frame.

10. The apparatus according to claim 9, wherein the frame includes two vertical supports and the isostatic connection means include a first constraint device to constrain a side of the structure to one of the vertical supports, with a rotation constraint about a second horizontal axis that is perpendicular to the horizontal axis defined by the centering means, and a second constraint device to constrain another side of the structure to the other vertical support, the second constraint device including a connection element having a spheric pendulum device.

11. The apparatus according to claim 1 or claim 2, including clamps fixing the centering means and the supporting device to the frame thereby providing the possibility of adjusting their position in a vertical direction.

12. The apparatus according to claim 1 or claim 2, wherein the control means include one or more horizontal control shafts parallel to the horiziontal axis, cranks arranged at the ends of the control shafts and transmission devices connected to the cranks to control the clamping and unclamping of the shaft to be checked by the centering means and the moving of the measuring means towards and away from the shaft to be checked.

13. The apparatus according to claim 12, wherein said control means also include a loading and unloading device, to load the shaft to be checked by raising it towards the centering means and further transmission devices driven by at least one of the cranks to control the loading and unloading device.

14. The apparatus according to claim 1 or claim 2, wherein the transducer and detection means include processing circuits to process combinations of signals relating to different measuring units and gauging heads adapted to detect the mutual position of the measuring units in order to provide compensation signals to the processing circuits.

15. Use of the apparatus according to claim 1 or claim 2, wherein the apparatus checks the geometrical dimensions of crankshafts staticly or while the crankshaft rotates about the axis defined by the main journals.

* * * * *